(12) United States Patent
Luo

(10) Patent No.: US 7,412,011 B2
(45) Date of Patent: Aug. 12, 2008

(54) JOINT RATIO ESTIMATION AND WEIGHTS DETECTION IN CLOSED LOOP TRANSMIT DIVERSITY

(75) Inventor: Tao Luo, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 628 days.

(21) Appl. No.: 10/652,290

(22) Filed: Aug. 29, 2003

(65) Prior Publication Data

US 2005/0047529 A1 Mar. 3, 2005

(51) Int. Cl.
*H03D 1/00* (2006.01)

(52) U.S. Cl. ........................ 375/341; 375/130; 375/267; 375/299; 455/101

(58) Field of Classification Search .................. 375/130, 375/341, 267, 299
See application file for complete search history.

(56) References Cited

U.S. PATENT DOCUMENTS

| | | | | |
|---|---|---|---|---|
| 5,457,712 A | * | 10/1995 | Weerackody | 375/347 |
| 5,960,039 A | * | 9/1999 | Martin et al. | 375/267 |
| 6,611,675 B1 | * | 8/2003 | Salonen et al. | 455/69 |
| 2003/0035490 A1 | * | 2/2003 | Gollamudi | 375/267 |
| 2003/0169707 A1 | * | 9/2003 | Usuda et al. | 370/334 |
| 2003/0206601 A1 | * | 11/2003 | Shiu | 375/267 |
| 2005/0117660 A1 | * | 6/2005 | Vialle et al. | 375/299 |

OTHER PUBLICATIONS

Fukumoto, "Field experiments on closed loop mode transmit diversity in W-CDMA forward link", 2000 IEEE Sixth International Symposium on Spread Spectrum Techniques and Applications, 2000.*
Mostafa, "Feasibility of Smart Antennas for Small wireless terminals", Ph D dissertation Virginia Tech Apr. 25, 2003, pp. 1-24, and 96-106 chapters 1, 2 and 6 available on-line at http://scholar.lib.vt.edu/theses/available/etd-04282003-000635/unrestricted/Raqib_dissertation.pdf.*

* cited by examiner

*Primary Examiner*—Mohammad H. Ghayour
*Assistant Examiner*—Juan A. Torres
(74) *Attorney, Agent, or Firm*—Ronald O. Neerings; Wade J. Brady, III; Frederick J. Telecky, Jr.

(57) ABSTRACT

A communications device configured to extract weighting factors from incoming signals received from two or more antennas while estimating a channel ratio for the signals. The device includes at least one antenna and a digital signal processor. The method includes receiving two signals and extracting the weighting factors while estimating the channel ratio.

59 Claims, 2 Drawing Sheets

JOINT RATIO ESTIMATION AND WEIGHTS DETECTION IN CLOSED LOOP TRANSMIT DIVERSITY

BACKGROUND OF THE INVENTION

1. Technical Field of the Invention

The present invention relates generally to wireless systems and more particularly to determining ratio estimations and weightings for multi-antenna verification.

2. Background Information

The increasing use of wireless communications leads to a need for clearer transmissions using less to do more. The move to multiple antenna systems has caused a need for new ways to balance transmissions over more than one antenna to one or more receiving antennas. In some cases, weighting factors may be used for balancing the transmissions. It is thus desirable to implement a convenient way to determine weighting factors from a received transmission to maximize some transmission condition, such as a maximized signal to noise ratio.

SUMMARY OF THE INVENTION

According to one embodiment of the present invention, a device is provided. The device includes at least one antenna and a digital signal processor. The antenna is capable of receiving a first signal from a first antenna and a second signal from a second antenna. The digital signal processor is configured to extract a first weighting factor and a second weighting factor from the first signal and the second signal while estimating a channel ratio for the first signal and the second signal.

Notation and Nomenclature

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

I. BRIEF DESCRIPTION OF THE DRAWINGS

For a more detailed description of the preferred embodiments of the present invention, reference will now be made to the accompanying drawings, wherein.

II. DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
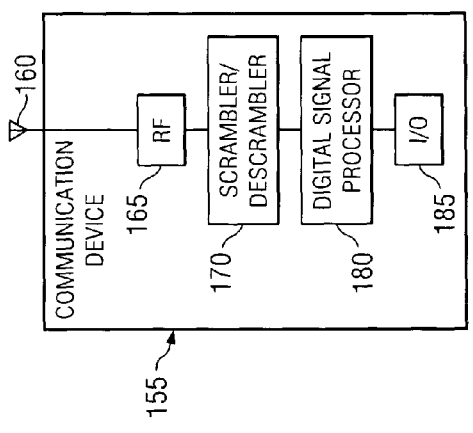
FIGS. 1A and 1B shows a diagram of a system in accordance with preferred embodiments of the invention and including a transmitter with multiple antennas and a receiver.
Figure 1B:
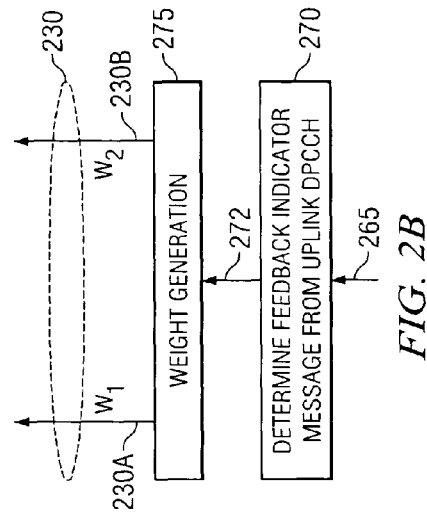

Referring now to FIGS. 1A and 1B, communications system 100 is shown, in accordance with a preferred embodiment of the invention. As shown, the communications system 100 includes at least one base station 105, or transmitter 105, preferably coupled to a network 95, and a communications device 155, or receiver 155. In various embodiments, the base station 105 may include a transmitter and a receiver, while the communications device 155 may also include a transmitter and a receiver.

As shown in FIG. 1A, the base station 105 includes an input/output (I/O) block 110, a digital signal processor (DSP) block 115, a scrambler/descrambler (S/D) 120, a plurality of RF units 125A and 125B, and a plurality of antennas 130A and 130B. As shown in FIG. 1A, the I/O block 110 is coupled to the DSP block 115. The DSP block 115 is coupled to the S/D 120. The S/D 120 is coupled to the RF units 125A and 125B. The RF unit 125A is coupled to the first antenna 130A. The RF unit 125B is coupled to the second antenna 130B.

As shown in FIG. 1B, the communications device 155 includes an input/output (I/O) block 185, a digital signal processing (DSP) block 180, a scrambler/descrambler (S/D) 170, an RF unit 165, and an antenna 160. As shown in FIG. 1B, the antenna 160 is coupled to the RF unit 165. The RF unit 165 is coupled to the S/D 170. The S/D 170 is coupled to the DSP block 180. The DSP block 180 is coupled to the I/O block 185.

As used herein, an I/O block, such as I/O block 110 and/or I/O block 185, may include any one or more of a digital, analog, visual, optical, tactile, electronic, electrical, voice, and/or sonic input or output device or devices for interfacing with a person, electronic device, system, or network. As used herein, a DSP block 115 and/or DSP block 180 may include a digital signal processor chip, or chips, a controller, a microcontroller, a processor, a microprocessor, and/or configured hardware, firmware, or software. As used herein, the S/D 120 and/or S/D 170 may include separate or integrated scrambler and descrambler, when each is present. The network 95 may include any communications, electronic, and/or optical network carrying voice, audio, video, commands, instructions, data or any combination thereof.

The communications system 100 may be representative of, or adapted to, a wide variety of electronic systems. An exemplary electronic system may comprise a battery-operated, mobile cell phone 155 and base station 105, such as is configured to operate using third generation methods such as W-CDMA (from 3GPP). As such, the cell phone 155 may include a keypad, display, microphone, and speaker in the I/O block 185.

Figure 2A:
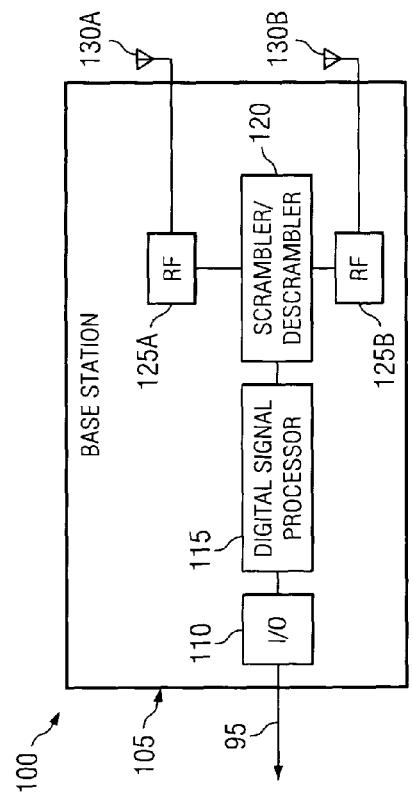
FIGS. 2A and 2B depicts an exemplary embodiment of a transmission flow diagram.
Figure 2B:
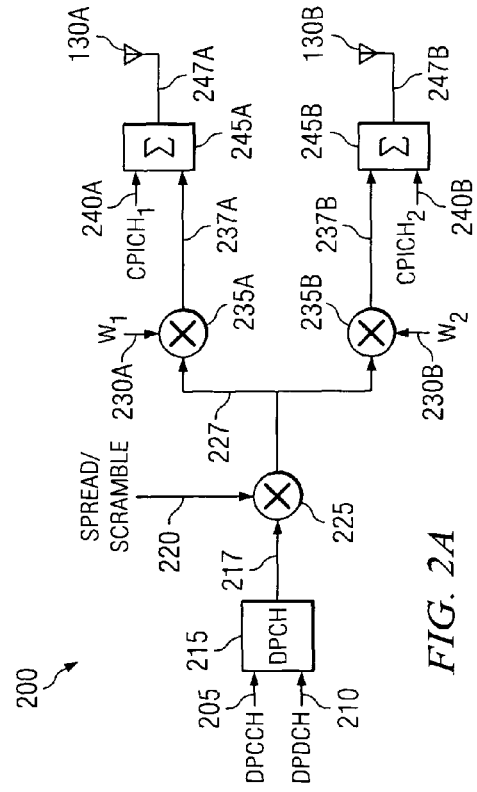

Referring now to FIG. 2, an exemplary embodiment of a transmission flow diagram 200, according to a preferred embodiment of the present invention is shown. In the embodiment shown, the transmission flow is for a W-CDMA configured system. Other embodiments for other systems using other configurations are also contemplated. As shown in FIG. 2, a dedicated physical control channel (DPCCH) 205 and a dedicated physical data channel (DPDCH) 210 are provided to a dedicated physical channel (DPCH) 215. The DPCH 215 provides a signal 217 to a combiner 225 that combines the signal 217 with an spread and/or scramble signals 220. The spread/scrambled signal 227 is provided to a first combiner 235A along with a first weighting factor $w_1$ 230A. The weighted signal 237A is provided to a summer 245A for combination with common pilot signals ($CPICH_1$) 240A. The weighted pilot signals 247A are provided to a first antenna 130A for transmission.

The spread/scrambled signal 227 is also provided to a second combiner 235B along with a second weighting factor $w_2$ 230B. The weighted signal 237B is provided to a summer 245B for combination with common pilot signals ($CPICH_2$) 240B. The weighted pilot signals 247B are provided to a second antenna 130B for transmission. As shown in FIG. 2, the first weighting factor $w_1$ 230A and the second weighting factor $w_2$ 230B are generated in block 275 from a signal 272 extracted from the feedback indicator (FBI) field message 265 received in the DPCCH from the receiver in block 270.

Note that the operations performed in blocks 230, 325, 330, 335, and/or 340 may be performed in the DSP block 115. Some or all of the operations performed in blocks 230, 325, 330, 335, and/or 340 may also be performed in separate software routines or in separate, dedicated hardware.

Figure 3:
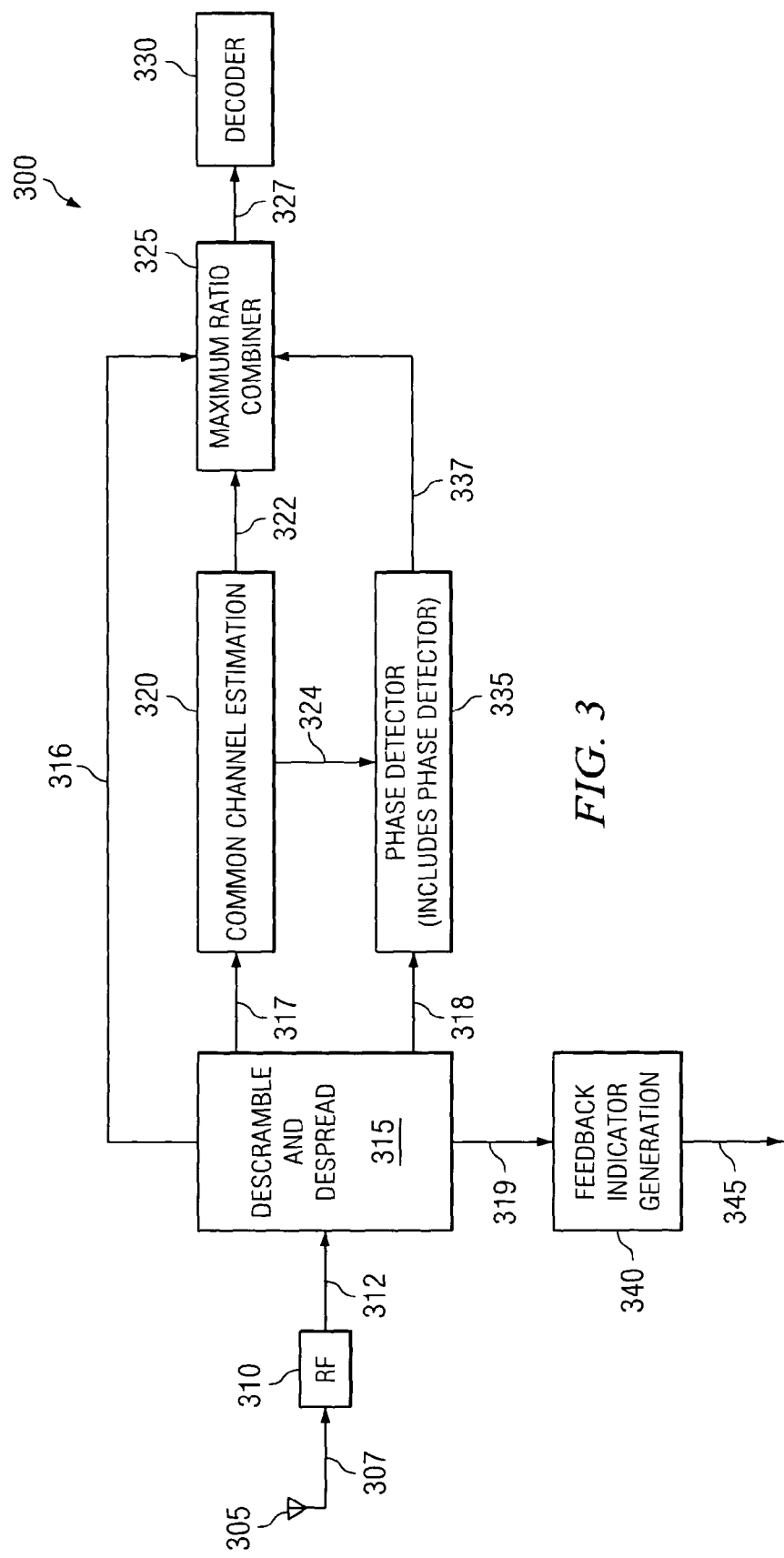
FIG. 3 depicts an exemplary embodiment of a reception flow diagram.

Referring now to FIG. 3, an exemplary embodiment of a reception flow diagram is shown, according to a preferred embodiment of the present invention. As shown in FIG. 3, a signal 307 is received at an antenna 305. The signal 307 is provided to an RF unit 310, which downconverts the signal 307 to the baseband as signal 312. The signal 312 is descrambled and despreaded in block 315 to create signals 317, 318, and 319.

The signal 317 represents the common pilot symbols used for common channel estimation in block 320 to create signals 322 and 324, each an estimate of the channels $g_1(n)$ and $g_2(n)$. The channel estimates $g_1(n)$ and $g_2(n)$, signal 324, along with the dedicated pilot symbols (y(n)), signal 318, are used to do the phase detection. The dedicated physical data channel (DPDCH) 316 is provided to the MRC (Maximum Ratio Combiner) 325. According to a preferred embodiment of the present invention, the joint weights and ratio estimation is done inside the phase detector. The output of the phase detector, signal 337, is a combination of a first weighting factor $w_1$ 230A and a second weighting factor $w_2$ 230B, i.e., one of 16 combinations of possible $w_1$ and $w_2$ in this embodiment, where $w_1$ and $w_2$ are complex. In some embodiments, one of $w_1$ and $w_2$ may be complex while the other is real. In general, the weighting factors are complex valued signals, i.e., $w_i=a_i+jb_i$.

The channel estimates, $g_1(n)$ and $g_2(n)$, signal 322, and the weighting factors $w_1$ and $w_2$ 327 are provided to the MRC 325 to generate the channel estimate, h(n), to be used in the MRC. The output of the MRC, signal 337, is provided to the decoder 330. The common pilot signals 319 are provided to the FBI generation block 340 by the block 315, where the FBI bit or bits 345 are generated to be sent to the base station.

Operation of the communications system 100 may be performed in closed loop transmit diversity as in non-diversity for channel coding, interleaving and/or spreading. The spread and preferably complex valued signal may be fed to both transmit antennas 130A and 130B. Each signal is typically weighted with an antenna specific weighting factor, $w_1$ or $w_2$.

In one embodiment, the weighting factors $w_1$ and $w_2$ are corresponding phase adjustments in closed loop mode 1 and phase and amplitude adjustments in closed loop mode 2. The weighting factors to be used in a transmission may be determined by the device 155 and transmitted to the base station 105 using the FBI field. In one embodiment, in the closed loop mode 1, different orthogonal dedicated pilot symbols in the DPCCH are sent using the two different antennas 130A and 130B. For closed loop mode 2 the same dedicated pilot symbols in the DPCCH are sent on both antennas 130A and 130B. There are two closed loop modes whose characteristics are summarized in the Table 1. The use of the modes is controlled via higher layer signaling.

TABLE 1—Summary of number of feedback information bits per slot, $N_{FBD}$, feedback command length in slots, $N_W$, feedback command rate, feedback bit rate, number of phase bits, $N_{PH}$, per signalling word, number of amplitude bits, $N_{PO}$, per signalling word and amount of constellation rotation at the device for the two closed loop modes

| Closed Loop Mode | $N_{FBD}$ | $N_W$ | Update Rate | Feedback Bit Rate | $N_{PO}$ | $N_{PH}$ | Constellation Rotation |
|---|---|---|---|---|---|---|---|
| 1 | 1 | 1 | 1500 Hz | 1500 bps | 0 | 1 | $\pi/2$ |
| 2 | 1 | 4 | 1500 Hz | 1500 bps | 1 | 3 | N/A |

For both modes, orthogonal common pilot (CPICH) symbols are sent from two antennas 130A and 130B. Note that no weights are applied to the CPICH symbols. At the receiver 155, in order to perform the MRC operations, we need to estimate the channel gain h(n).

$$h(n)=w_1(n)h_1(n)+w_2(n)h_2(n) \quad (1)$$

where $h_i(n)$ are the stacked (column vector) channel gains from the ith antenna 130i to the device 155 via different paths at the nth slot. In one embodiment, there are 15 slots per frame with 100 frames per second. There are at least two options to estimate h(n):

1. Channel estimation using the dedicated pilot symbols only, or
2. Channel estimation using both the dedicated pilot symbols and the CPICH symbols. It has previously been shown that the first option does not provide a satisfying performance for both modes. Simulations verify this result.

Thus, for antenna verification option 2 is needed for both modes where $h_i(n)$ are estimated from the CPICH symbols as g(n):

$$g(n)=w_1(n)g_1(n)+w_2(n)g_2(n) \quad (2)$$

with $g_i(n)$ being proportional to $h_i(n)$. To detect the weighting factors, we will use the dedicated pilot symbols and the channel estimate from the CPICH symbols.

After despreading, the received signal for DPCH dedicated pilot symbols for the mode 2 can be written as:

$$y_{d2}(n,i)=b_i(w_1 h_1(n)+w_2 h_2(n))+n(n,i) \quad (3)$$

where $b_i$ are the dedicated pilot symbols. Note that for mode 2, the dedicated pilot symbols are the same for both antennas 130A and 130B.

From equation 3, we can derive the joint probability density function (PDF) of $y_{d2}(n,i)$ conditioned on the weights $w_i$. Define y(n):

$$y(n)=[y_{d2}(n,1) y_{d2}(n,2) \ldots y_{d2}(n,K)]^T \quad (4)$$

Then it can be shown that $$p(y|w) = \frac{1}{\pi^M \det(C)} e^{[-(y(n)-\mu_2(n))^H C^{-1}(y(n)-\mu_2(n))]} \quad (5)$$

where C, a diagonal variance matrix, is given by $$C = \begin{bmatrix} \sigma_1^2 & & & & & & & & & & \\ & \sigma_2^2 & & & & & & & & & \\ & & \ldots & & & & & & & & \\ & & & \sigma_L^2 & & & & & & & \\ & & & & \sigma_1^2 & & & & & & \\ & & & & & \sigma_2^2 & & & & & \\ & & & & & & \ldots & & & & \\ & & & & & & & \sigma_L^2 & & & \\ & & & & & & & & \ldots & & \\ & & & & & & & & & \sigma_L^2 \end{bmatrix}_{KL} \quad (6)$$

where each $\sigma_l$ is a variance, and $\mu_2(n)$ is given by $$\mu_2(n) = \begin{bmatrix} \frac{1}{\sqrt{2}} b_1(w_1 h_1(n) + w_2 h_2(n)) & \frac{1}{\sqrt{2}} b_2(w_1 h_1(n) + w_2 h_2(n)) & \cdots & \frac{1}{\sqrt{2}} b_K(w_1 h_1(n) + w_2 h_2(n)) \end{bmatrix}^T \quad (7)$$

where $b_j$ is a jth dedicated pilot symbol. Note the dimension of $\mu_2(n)$ is also KL, where K is a number of dedicated pilot symbols and L is a number of paths.

Since the uplink feedback error rate is typically within a certain predictable range, assume that the actual feedback error rate is known (for now), such that MAP detection can be used for the weighting factor detection. For MAP detection, the following optimization problem is to be solved:

$$\hat{w} = \underset{w}{\mathrm{argmax}}\, p(y \mid w) \quad (8a)$$

$$\hat{w} = \underset{w}{\mathrm{argmax}}\, \frac{p(y \mid w) p(w)}{p(y)} \quad (8b)$$

$$\hat{w} = \underset{w}{\mathrm{argmax}}\, p(y \mid w) p(w) \quad (8c)$$

For the MAP detector, we need to make assumptions about p(w) because in one embodiment, p(w) depends on four feedback bits received by the base station within the most recent four slots. At the device 155, the device 155 may record the most recent FBI bits it has sent to the base station. In one embodiment, four bits are recorded. Note that feedback error may not be independent for slow fading cases. However, to simplify the analysis, assume that the feedback errors are independent of each other. Then, we calculate p(w).

Similar to the ML detector shown later, for the MAP detector, starting with equation 8c:

$$\hat{w} = \underset{w}{\mathrm{argmax}}\, p(y \mid w) p(w) \quad (9a)$$

$$= \underset{w}{\mathrm{argmax}}\, [-(y(n) - \mu_2(n))^H C^{-1}(y(n) - \mu_2(n)) + 10\ln(p(w))] \quad (9b)$$

$$= \underset{w}{\mathrm{argmax}}\, [-2\mathrm{Real}\{(y(n)^H C^{-1} \mu_2(n))\} + \mu_2(n)^H C^{-1} \mu_2(n) + 10\ln(p(w))] \quad (9c)$$

Note that $g_i(n)$ replaces $h_i(n)$, because $h_i(n)$ is not known. Because there is an additive term in equation 9c, $\mu_2(n)$ must be scaled by the amplitude ration between the CPICH symbols and the dedicated pilot symbols.

Therefore, the channel gain ratio between the dedicated pilot symbols and the CPICH symbols must be estimated. The channel gain ratio a(n) may be given as:

$$a(n) = \frac{h_j(n, i)}{g_j(n, i)} \quad (10)$$

where $h_j(n,i)$ represents the channel gain of the ith path from the jth antenna 130j for the dedicated pilot symbols, and the $g_j(n,i)$ represents the channel gain for the ith path from the jth antenna 130j for the common pilot symbols.

For a maximum likelihood (ML) detector, we have the following problem:

$$\hat{w} = \underset{w}{\mathrm{argmax}}\, p(y \mid w) \quad (11a)$$

$$= \underset{w}{\mathrm{argmax}}\, [-(y(n) - \mu_2(n))^H C^{-1}(y(n) - \mu_2(n))] \quad (11b)$$

$$= \underset{w}{\mathrm{argmax}}\, [-2\mathrm{Real}\{(y(n)^H C^{-1} \mu_2(n))\} + \mu_2(n)^H C^{-1} \mu_2(n)] \quad (11c)$$

The problem may be seen as estimating the power ratio between the CPICH symbols and the dedicated pilot symbols, only needing to scale y(n).

First, the following estimation of the channel gain from the dedicated pilot symbols:

$$f(n) = \frac{1}{K} \sum_{i=1}^{K} b_i^* y_{d2}(n, i) = a\hat{g}(n) + (n) \quad (12)$$

where the elements of (n) are joint white Gaussian noise with variance $\sigma_{l,p}$ for the lth path.

Thus, it can be shown that $$p(f(n, l) \mid a) = \frac{1}{\pi \sigma_{l,p}^2} e^{\left[-\frac{|f(n,l)-a\hat{g}(n,l)|^2}{\sigma_{l,p}^2}\right]} \quad (13)$$

where ĝ(n,l) represents the composite channel gain for the lth path (or the lth component) of ĝ(n).

Since p and l are independent of each other, equation 10 can be rewritten as $$p(f(n, 1), f(n, 2), \ldots, f(n, L) \mid a) = \qquad (14)$$

$$\frac{1}{\pi^L \prod_{l=1}^{L} \sigma_{l,p}^2} e^{\left[-\sum_{l=1}^{L} \frac{|f(n,l)-a\hat{g}(n,l)|^2}{\sigma_{l,p}^2}\right]}$$

The ML estimate of a is achieved by $$\hat{a} = \underset{x>0}{\mathrm{argmax}}\, p(f_1, f_2, \ldots, f_L \mid a) \quad (15a)$$

$$= \underset{x>0}{\mathrm{argmax}} \left[ -\sum_{l=1}^{L} \frac{|f(n, l) - a\hat{g}(n, l)|^2}{\sigma_{l,p}^2} \right] \quad (15b)$$

$$= \underset{x>0}{\mathrm{argmax}} \left[ \sum_{l=1}^{L} \frac{2a\,\mathrm{Real}\{f(n, l)^* \hat{g}(n, l)\} - a^2 |\hat{g}(n, l)|^2}{\sigma_{l,p}^2} \right] \quad (15c)$$

Differentiating equation 15c with respect to a and setting the result to zero, the result is the following ML estimate of a:

$$\hat{a} = \frac{\sum_{l=1}^{L} \frac{\mathrm{Real}\{f(n, l)^* \hat{g}(n, l)\}}{\sigma_{l,p}^2}}{\sum_{l=1}^{L} \frac{|\hat{g}(n, l)|^2}{\sigma_{l,p}^2}} = \frac{\sum_{l=1}^{L} \frac{\mathrm{Real}\{f(n, l)^* \hat{g}(n, l)\}}{\sigma_l^2}}{\sum_{l=1}^{L} \frac{|\hat{g}(n, l)|^2}{\sigma_l^2}} \quad (16)$$

For the single path case, equation 16 reduces to:

$$\hat{a} = \frac{\mathrm{Real}\{f(n, l)^* \hat{g}(n, l)\}}{|\hat{g}(n, l)|^2} = \mathrm{Real}\left\{\left(\frac{f(n, l)}{\hat{g}(n, l)}\right)^*\right\} \quad (17)$$

Because the power ratio should be same for all paths, two simpler heuristic-based estimators are:

1. Combine power from each path for both the DPCH power and the CPICH power and then we take the ratio of them, or 2. Take the ratio for each individual path and then do the average of the ratio from different paths.

Simulations have demonstrated that the heuristic approach may outperform the ML approach. In addition, because the first heuristic approach has less complexity, it is used as an example.

Apply the following estimator for a:

$$\hat{a}_{w_1, w_2} = \sqrt{\frac{|f(n)|^2}{|\hat{w}_1 \hat{g}_1(n) + \hat{w}_2 \hat{g}_2(n)|^2}} \quad (18)$$

Equation 18 is just a specific implementation example where we calculate the total energy from the dedicated pilot symbols and the common pilot symbols first and then we get the ratio of them. In the denominator of equation 18, the estimated weighting factors ŵ are used. If $\hat{w}_i = w_i$, then the estimates are exact.

Substituting equation 18 into equation 10, $$a_{w_1, w_2} = \frac{|f(n)|^2}{|\hat{w}_1(n)\hat{g}_1(n) + \hat{w}_2(n)\hat{g}_2(n)|^2} \approx \frac{|\hat{w}_1(n)h_1(n) + \hat{w}_2(n)h_2(n)|^2}{|\hat{w}_1(n)\hat{g}_1(n) + \hat{w}_2(n)\hat{g}_2(n)|^2} \quad (19)$$

At the time of estimating a, $\hat{w}_i$ is still not available. According to one aspect of the present invention, a joint power ratio estimator and weighting factor detection method is provided. Instead of estimating the ratio separately, calculate the following equation 20 for different combinations of $w_1$ and $w_2$ (totaling 16 combinations in the embodiment consistent with Technical Specification 3GPP TS 25.101 V6.1.0 (2003-06), 3rd Generation Partnership Project Group Radio Access Network, User Equipment (UE) radio transmission and reception (FDD) (Release 6), which is hereby incorporated by reference in its entirety, available from 3GPP c/o ETSI; Mobile Competence Centre; 650, route des Lucioles; 06921 Sophia-Antipolis Cedex; FRANCE or on the World Wide Web, for each slot (starting from equation 11c):

$$\hat{w} = \underset{w}{\mathrm{arg\,max}}[-2\mathrm{Real}\{(y(n)^H C^{-1} \mu_2(n))\} + \mu_2(n)^H C^{-1} \mu_2(n)] \quad (20a)$$

-continued $$\hat{w} = \arg\max_{w} \left[ \sum_{l=1}^{L} -2\text{Real} \left\{ \frac{y_{d2}(n,l)^H \begin{bmatrix} \frac{d(1)(\hat{w}_1 \hat{g}_1(n,l) + \hat{w}_2 \hat{g}_2(n,l))}{a_{w_1,w_2}} \\ \frac{d(2)(\hat{w}_1 \hat{g}_1(n,l) + \hat{w}_2 \hat{g}_2(n,l))}{a_{w_1,w_2}} \\ \cdots \\ \frac{d(K)(\hat{w}_1 \hat{g}_1(n,l) + \hat{w}_2 \hat{g}_2(n,l))}{a_{w_1,w_2}} \end{bmatrix}}{\sigma_l^2} \right\} + \mu_2(n)^H C^{-1} \mu_2(n) \right]$$

(20b)

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \cdots \right.$$
$$\left. \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation. In equation 20b, the ratio estimator is integrated into the weights detector. For each combination of $w_1$ and $w_2$, the ratio is estimated by using the weights combination under the test. In conventional approaches, the ratio is estimated first and is fixed for all 16 hypotheses.

For the MAP detector, it can be shown that equation 20b becomes (starting from Equation 9c):

$$\hat{w} = \arg\max_{w} [-2\text{Real}\{(y(n)^H C^{-1} \mu_2(n))\} + \mu_2(n)^H C^{-1} \mu_2(n) + 10\ln(p(w))]$$

(21a)

$$\hat{w} = \arg\max_{w} \left[ \sum_{l=1}^{L} -2Real \left\{ \frac{y_{d2}(n,l)^H \begin{bmatrix} d(1)(\hat{w}_1 \hat{g}_1(n,l) + \hat{w}_2 \hat{g}_2(n,l)) a_{w1,w2} \\ d(2)(\hat{w}_1 \hat{g}_1(n,l) + \hat{w}_2 \hat{g}_2(n,l)) a_{w1,w2} \\ \cdots \\ d(K)(\hat{w}_1 \hat{g}_1(n,l) + \hat{w}_2 \hat{g}_2(n,l)) a_{w1,w2} \end{bmatrix}}{(\sigma_l^2)} \right\} + \right.$$
$$\left. a_{w_1,w_2} \mu_2(n)^H C^{-1} \mu_2(n) + 10\ln(p(w)) \right]$$

Equation (21b)

where $\hat{w}_1$ is an estimate for the first weighting factor, $\hat{w}_2$ is an estimate for the Second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \cdots \right.$$
$$\left. \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A device, comprising:
   at least one antenna capable of receiving a first signal from a first antenna and a second signal from a second antenna; and
   a digital signal processor configured to extract a first weighting factor and a second weighting factor from the first signal and the second signal while estimating a channel ratio for the first signal and the second signal, and to perform signal combining using the first weighting factor and the second weighting factor;

wherein the channel ratio being estimated comprises a channel gain ratio between dedicated pilot symbols and common pilot symbols.

2. The device of claim 1, further comprising:

an RF unit configured to convert the first signal and the second signal to baseband signals; and wherein the digital signal processor is configured to extract the first weighting factor and the second weighting factor from the baseband signals while estimating a channel ratio for the baseband signals.

3. The device of claim 2, further comprising:

a descrambler configured to descramble the baseband signals.

4. The device of claim 1, wherein the digital signal processor is further configured to use an estimation of the channel ratio.

5. The device of claim 4, wherein the estimation of the channel ratio â is expressible as:

$$\hat{a}_{w_1,w_2} = \sqrt{\frac{|f(n)|^2}{|\hat{w}_1\hat{g}_1(n) + \hat{w}_2\hat{g}_2(n)|^2}},$$

where f(n) is an estimate of a channel gain, $\hat{w}_1$ is an estimate for the first weighting factor, $\hat{w}_2$ is an estimate for the second weighting factor, $\hat{g}_1(n)$ is an estimate of a first channel gain, $\hat{g}_2(n)$ is an estimate of a second channel gain, for slot n.

6. The device of claim 5, wherein the estimate of the channel gain f(n) is an estimate of a channel gain for dedicated pilot symbols, wherein the estimate of the first channel gain $\hat{g}_1(n)$ is an estimate of a first channel gain for dedicated pilot symbols, and wherein the estimate of the second channel gain $\hat{g}_2(n)$ is an estimate of a second channel gain for dedicated pilot symbols.

7. The device of claim 5, wherein the digital signal processor is further configured consistent with a maximum likelihood method.

8. The device of claim 7, wherein the maximum likelihood method uses an estimation for weighting factors expressible as:

$$\hat{w} = \underset{w}{\mathrm{argmax}}\left[\sum_{l=1}^{L} -2\mathrm{Real}\left\{\frac{y_{d2}(n,l)^H \begin{bmatrix} \frac{d(1)(\hat{w}_1\hat{g}_1(n,l) + \hat{w}_2\hat{g}_2(n,l))}{a_{w_1,w_2}} \\ \frac{d(2)(\hat{w}_1\hat{g}_1(n,l) + \hat{w}_2\hat{g}_2(n,l))}{a_{w_1,w_2}} \\ \cdots \\ \frac{d(K)(\hat{w}_1\hat{g}_1(n,l) + \hat{w}_2\hat{g}_2(n,l))}{a_{w_1,w_2}} \end{bmatrix}}{\sigma_l^2}\right\} + \mu_2(n)^H C^{-1}\mu_2(n)\right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[\frac{1}{\sqrt{2}}b_1(w_1h_1(n) + w_2h_2(n)) \quad \frac{1}{\sqrt{2}}b_2(w_1h_1(n) + w_2h_2(n)) \quad \cdots \quad \frac{1}{\sqrt{2}}b_K(w_1h_1(n) + w_2h_2(n))\right]^T,$$

where $b_j$ is a jth dedicated pilot symbol, $h_i(n)$ are stacked channel gains from an ith antenna to the device via different paths at an nth slot, and T is a matrix transpose operation.

9. The device of claim 5, wherein the digital signal processor is further configured consistent with a maximum a priori (MAP) method.

10. The device of claim 9, wherein the MAP likelihood method uses an estimation for weighting factors expressible as:

$$\hat{w} = \underset{w}{\mathrm{argmax}} \left[ \sum_{l=1}^{L} -2\mathrm{Real}\left\{ \frac{y_{d2}(n,l)^H \begin{bmatrix} d(1)(\hat{w}_1 \hat{g}_1(n,l) + \hat{w}_2 \hat{g}_2(n,l))a_{w_1,w_2} \\ d(2)(\hat{w}_1 \hat{g}_1(n,l) + \hat{w}_2 \hat{g}_2(n,l))a_{w_1,w_2} \\ \cdots \\ d(K)(\hat{w}_1 \hat{g}_1(n,l) + \hat{w}_2 \hat{g}_2(n,l))a_{w_1,w_2} \end{bmatrix}}{\sigma_l^2} \right\} + a_{w_1,w_2}\mu_2(n)^H C^{-1} \mu_2(n) + 10\ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \cdots \right.$$

-continued $$\left. \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

11. The device of claim 1, wherein the digital signal processor is further configured consistent with a maximum likelihood method.

12. The device of claim 11, wherein the maximum likelihood method uses an estimation for weighting factors expressible as:

$$\hat{w} = \underset{w}{\mathrm{argmax}} \left[ \sum_{l=1}^{L} -2\mathrm{Real}\left\{ \frac{y_{d2}(n,l)^H \begin{bmatrix} \frac{d(1)(\hat{w}_1 \hat{g}_1(n,l) + \hat{w}_2 \hat{g}_2(n,l))}{a_{w_1,w_2}} \\ \frac{d(2)(\hat{w}_1 \hat{g}_1(n,l) + \hat{w}_2 \hat{g}_2(n,l))}{a_{w_1,w_2}} \\ \cdots \\ \frac{d(K)(\hat{w}_1 \hat{g}_1(n,l) + \hat{w}_2 \hat{g}_2(n,l))}{a_{w_1,w_2}} \end{bmatrix}}{\sigma_l^2} \right\} + \mu_2(n)^H C^{-1} \mu_2(n) \right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

13. The device of claim 1, wherein the digital signal processor is further configured consistent with a maximum a priori (MAP) method.

14. The device of claim 13, wherein the MAP method uses an estimation for weighting factors expressible as:

$$\hat{w} = \underset{w}{\operatorname{argmax}} \left[ \sum_{l=1}^{L} -2\operatorname{Real}\left\{ \frac{y_{d2}(n, l)^H \begin{bmatrix} d(1)(\hat{w}_1\hat{g}_1(n, l) + \hat{w}_2\hat{g}_2(n, l))a_{w_1,w_2} \\ d(2)(\hat{w}_1\hat{g}_1(n, l) + \hat{w}_2\hat{g}_2(n, l))a_{w_1,w_2} \\ \ldots \\ d(K)(\hat{w}_1\hat{g}_1(n, l) + \hat{w}_2\hat{g}_2(n, l))a_{w_1,w_2} \end{bmatrix}}{\sigma_l^2} \right\} + a_{w_1,w_2}\mu_2(n)^H C^{-1} \mu_2(n) + 10\ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \; \frac{1}{\sqrt{2}} b_2(w_1 h_1(n) + w_2 h_2(n)) \ldots \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

15. The device of claim 1, wherein the device is configured as one or more of a cell phone or a computer.

16. A device, comprising:
at least one antenna means capable of receiving a first signal from a first antenna and a second signal from a second antenna;
means for extracting a first weighting factor and a second weighting factor from the first signal and the second signal while estimating a channel ratio for the first signal and the second signal; and
means for performing signal combining using the first weighting factor and the second weighting factors
wherein the channel ratio being estimated comprises a channel gain ratio between dedicated pilot symbols and common pilot symbols.

17. The device of claim 16, further comprising:
means for converting the first signal and the second signal to baseband signals, wherein the means for extracting the first weighting factor and the second weighting factor from the first signal and the second signal while estimating a channel ratio for the first signal and the second signal includes means for extracting the first weighting factor and the second weighting factor from the baseband signals while estimating a channel ratio for the baseband signals.

18. The device of claim 17, further comprising:
means for descrambling the baseband signals.

19. The device of claim 16, wherein the means for extracting the first weighting factor and the second weighting factor from the first signal and the second signal while estimating a channel ratio for the first signal and the second signal is further configured to use an estimation of the channel ratio.

20. The device of claim 19, wherein the estimation of the channel ratio â is expressible as:

$$\hat{a}_{w_1,w_2} = \sqrt{\frac{|f(n)|^2}{|\hat{w}_1\hat{g}_1(n) + \hat{w}_2\hat{g}_2(n)|^2}},$$

where f(n) is an estimate of a channel gain, $\hat{w}_1$ is an estimate for the first weighting factor, $\hat{w}_2$ is an estimate for the first weighting factor, $\hat{g}_1(n)$ is an estimate of a first channel gain, $\hat{g}_2(n)$ is an estimate of a second channel gain, for slot n.

21. The device of claim 20, wherein the estimate of the channel gain f(n) is an estimate of a channel gain for dedicated pilot symbols, wherein the estimate of the first channel gain $\hat{g}_1(n)$ is an estimate of a first channel gain for dedicated pilot symbols, and wherein the estimate of the second channel gain $\hat{g}_2(n)$ is an estimate of a second channel gain for dedicated pilot symbols.

22. The device of claim 20, wherein the means for extracting the first weighting factor and the second weighting factor from the first signal and the second signal while estimating a channel ratio for the first signal and the second signal is further configured consistent with a maximum likelihood method.

23. The device of claim 22, wherein the maximum likelihood method uses an estimation for weighting factors expressible as:

$$\hat{w} = \underset{w}{\operatorname{argmax}} \left[ \sum_{l=1}^{L} -2\operatorname{Real}\left\{ \frac{y_{d2}(n, l)^H \begin{bmatrix} \frac{d(1)(\hat{w}_1\hat{g}_1(n, l) + \hat{w}_2\hat{g}_2(n, l))}{a_{w_1,w_2}} \\ \frac{d(2)(\hat{w}_1\hat{g}_1(n, l) + \hat{w}_2\hat{g}_2(n, l))}{a_{w_1,w_2}} \\ \ldots \\ \frac{d(K)(\hat{w}_1\hat{g}_1(n, l) + \hat{w}_2\hat{g}_2(n, l))}{a_{w_1,w_2}} \end{bmatrix}}{\sigma_l^2} \right\} + \mu_2(n)^H C^{-1} \mu_2(n) \right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

24. The device of claim 20, wherein the means for extracting the first weighting factor and the second weighting factor from the first signal and the second signal while estimating a channel ratio for the first signal and the second signal is further configured consistent with a maximum a priori (MAP) method.

25. The device of claim 24, wherein the MAP method uses an estimation for weighting factors expressible as:

$$\hat{w} = \underset{w}{\mathrm{argmax}} \left[ \sum_{l=1}^{L} -2\mathrm{Real} \left\{ \frac{y_{d2}(n,l)^H \begin{bmatrix} d(1)(\hat{w}_1 \hat{g}_1(n,l) + \hat{w}_2 \hat{g}_2(n,l))a_{w_1,w_2} \\ d(2)(\hat{w}_1 \hat{g}_1(n,l) + \hat{w}_2 \hat{g}_2(n,l))a_{w_1,w_2} \\ \cdots \\ d(K)(\hat{w}_1 \hat{g}_1(n,l) + \hat{w}_2 \hat{g}_2(n,l))a_{w_1,w_2} \end{bmatrix}}{\sigma_l^2} \right\} + a_{w_1,w_2} \mu_2(n)^H C^{-1} \mu_2(n) + 10\ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

26. The device of claim 16, wherein the means for extracting the first weighting factor and the second weighting factor from the first signal and the second signal while estimating a channel ratio for the first signal and the second signal is further configured consistent with a maximum likelihood method.

27. The device of claim 26, wherein the maximum likelihood method uses an estimation for weighting factors expressible as:

$$\hat{w} = \underset{w}{\mathrm{argmax}} \left[ \sum_{l=1}^{L} -2\mathrm{Real} \left\{ \frac{y_{d2}(n, l)^H \left[ \begin{array}{c} \frac{d(1)(\hat{w}_1 \hat{g}_1(n, l) + \hat{w}_2 \hat{g}_2(n, l))}{a_{w_1, w_2}} \\ \frac{d(2)(\hat{w}_1 \hat{g}_1(n, l) + \hat{w}_2 \hat{g}_2(n, l))}{a_{w_1, w_2}} \\ \ldots \\ \frac{d(K)(\hat{w}_1 \hat{g}_1(n, l) + \hat{w}_2 \hat{g}_2(n, l))}{a_{w_1, w_2}} \end{array} \right]}{\sigma_l^2} \right\} + \mu_2(n)^H C^{-1} \mu_2(n) \right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

28. The device of claim 16, wherein the means for extracting the first weighting factor and the second weighting factor from the first signal and the second signal while estimating a channel ratio for the first signal and the second signal is further configured consistent with a maximum a priori (MAP) method.

29. The device of claim 28, wherein the MAP method uses an estimation for weighting factors expressible as:

$$\hat{w} = \underset{w}{\mathrm{argmax}} \left[ \sum_{l=1}^{L} -2\mathrm{Real} \left\{ \frac{y_{d2}(n, l)^H \left[ \begin{array}{c} d(1)(\hat{w}_1 \hat{g}_1(n, l) + \hat{w}_2 \hat{g}_2(n, l)) a_{w_1, w_2} \\ d(2)(\hat{w}_1 \hat{g}_1(n, l) + \hat{w}_2 \hat{g}_2(n, l)) a_{w_1, w_2} \\ \ldots \\ d(K)(\hat{w}_1 \hat{g}_1(n, l) + \hat{w}_2 \hat{g}_2(n, l)) a_{w_1, w_2} \end{array} \right]}{\sigma_l^2} \right\} + a_{w_1, w_2} \mu_2(n)^H C^{-1} \mu_2(n) + 10 \ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \ldots \right.$$

-continued
$$\left. \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

30. The device of claim 16, wherein the device is configured as one or more of a cell phone or a computer.

31. A communications system, comprising:
  a base station, comprising:
    a first antenna configured to transmit a first signal using a first weighting factor; and a second antenna configured to transmit a second signal using a second weighting factor; and a device, comprising:

at least one antenna capable of receiving the first signal from the first antenna and the second signal from the second antenna; and a digital signal processor configured to extract a first weighting factor and a second weighting factor from the first signal and the second signal while estimating a channel ratio for the first signal and the second signal, and to perform signal combining using the first weighting factor and the second weighting factor;

wherein the channel ratio being estimated comprises a channel gain ratio between dedicated pilot symbols and common pilot symbols.

32. The communications system of claim 31, wherein the device further comprises:

an RF unit configured to convert the first signal and the second signal to baseband signals; and wherein the digital signal processor is configured to extract the first weighting factor and the second weighting factor from the baseband signals while estimating a channel ratio for the baseband signals.

33. The communications system of claim 32, wherein the device further comprises:

a descrambler configured to descramble the baseband signals.

34. The communications system of claim 31, wherein the digital signal processor is further configured to use an estimation of the channel ratio.

35. The communications system of claim 34, wherein the estimation of the channel ratio â is expressible as:

$$\hat{a}_{w_1,w_2} = \sqrt{\frac{|f(n)|^2}{|\hat{w}_1 \hat{g}_1(n) + \hat{w}_2 \hat{g}_2(n)|^2}},$$

where f(n) is an estimate of a channel gain, $\hat{w}_1$ is an estimate for the first weighting factor, $\hat{w}_2$ is an estimate for the first weighting factor, $\hat{g}_1(n)$ is an estimate of a first channel gain, $\hat{g}_2(n)$ is an estimate of a second channel gain, for slot n.

36. The communications system of claim 35, wherein the estimate of the channel gain f(n) is an estimate of a channel gain for dedicated pilot symbols, wherein the estimate of the first channel gain $\hat{g}_1(n)$ is an estimate of a first channel gain for dedicated pilot symbols, and wherein the estimate of the second channel gain $\hat{g}_2(n)$ is an estimate of a second channel gain for dedicated pilot symbols.

37. The communications system of claim 35, wherein the digital signal processor is further configured consistent with a maximum likelihood method.

38. The communications system of claim 37, wherein the maximum likelihood method uses an estimation for weighting factors expressible as:

$$\hat{w} = \underset{w}{\mathrm{argmax}} \left[ \sum_{l=1}^{L} -2\mathrm{Real} \left\{ \frac{y_{d2}(n,l)^H \begin{bmatrix} \frac{d(1)(\hat{w}_1 \hat{g}_1(n,l) + \hat{w}_2 \hat{g}_2(n,l))}{a_{w_1,w_2}} \\ \frac{d(2)(\hat{w}_1 \hat{g}_1(n,l) + \hat{w}_2 \hat{g}_2(n,l))}{a_{w_1,w_2}} \\ \cdots \\ \frac{d(K)(\hat{w}_1 \hat{g}_1(n,l) + \hat{w}_2 \hat{g}_2(n,l))}{a_{w_1,w_2}} \end{bmatrix}}{\sigma_l^2} \right\} + \mu_2(n)^H C^{-1} \mu_2(n) \right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

39. The communications system of claim 35, wherein the digital signal processor is further configured consistent with a maximum a priori (MAP) method.

40. The communications system of claim 39, wherein the MAP method uses an estimation for weighting factors expressible as:

$$\hat{w} = \underset{w}{\operatorname{argmax}} \left[ \sum_{l=1}^{L} -2\operatorname{Real} \left\{ \frac{y_{d2}(n,l)^H \begin{bmatrix} d(1)(\hat{w}_1 \hat{g}_1(n,l) + \hat{w}_2 \hat{g}_2(n,l))a_{w_1,w_2} \\ d(2)(\hat{w}_1 \hat{g}_1(n,l) + \hat{w}_2 \hat{g}_2(n,l))a_{w_1,w_2} \\ \cdots \\ d(K)(\hat{w}_1 \hat{g}_1(n,l) + \hat{w}_2 \hat{g}_2(n,l))a_{w_1,w_2} \end{bmatrix}}{\sigma_l^2} \right\} + a_{w_1,w_2} \mu_2(n)^H C^{-1} \mu_2(n) + 10\ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \cdots \right.$$

-continued $$\left. \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

41. The communications system of claim 31, wherein the digital signal processor is further configured consistent with a maximum likelihood method.

42. The communications system of claim 41, wherein the maximum likelihood method uses an estimation for weighting factors expressible as:

$$\hat{w} = \underset{w}{\operatorname{argmax}} \left[ \sum_{l=1}^{L} -2\operatorname{Real} \left\{ \frac{y_{d2}(n,l)^H \begin{bmatrix} \frac{d(1)(\hat{w}_1 \hat{g}_1(n,l) + \hat{w}_2 \hat{g}_2(n,l))}{a_{w_1,w_2}} \\ \frac{d(2)(\hat{w}_1 \hat{g}_1(n,l) + \hat{w}_2 \hat{g}_2(n,l))}{a_{w_1,w_2}} \\ \cdots \\ \frac{d(K)(\hat{w}_1 \hat{g}_1(n,l) + \hat{w}_2 \hat{g}_2(n,l))}{a_{w_1,w_2}} \end{bmatrix}}{\sigma_l^2} \right\} + \mu_2(n)^H C^{-1} \mu_2(n) \right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

43. The communications system of claim 31, wherein the digital signal processor is further configured consistent with a maximum a priori (MAP) method.

44. The communications system of claim 43, wherein the MAP method uses an estimation for weighting factors expressible as:

$$\hat{w} = \underset{w}{\operatorname{argmax}} \left[ \sum_{l=1}^{L} -2\operatorname{Real}\left\{ \frac{y_{d2}(n,l)^H \begin{bmatrix} d(1)(\hat{w}_1\hat{g}_1(n,l) + \hat{w}_2\hat{g}_2(n,l))a_{w_1,w_2} \\ d(2)(\hat{w}_1\hat{g}_1(n,l) + \hat{w}_2\hat{g}_2(n,l))a_{w_1,w_2} \\ \ldots \\ d(K)(\hat{w}_1\hat{g}_1(n,l) + \hat{w}_2\hat{g}_2(n,l))a_{w_1,w_2} \end{bmatrix}}{\sigma_l^2} \right\} + a_{w_1,w_2}\mu_2(n)^H C^{-1}\mu_2(n) + 10\ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \; \frac{1}{\sqrt{2}} b_2(w_1 h_1(n) + w_2 h_2(n)) \; \ldots \; \frac{1}{\sqrt{2}} b_K(w_1 h_1(n) + w_2 h_2(n)) \right]^T,$$

where $b_j$ is a jth dedicated pilot symbol, h (n) are stacked channel gains from an ith antenna to the device via different paths at an nth slot, and T is a matrix transpose operation.

45. The communications system of claim 31, wherein the device is configured as one or more of a cell phone or a computer.

46. A method for improving communications, the method comprising:
receiving a first signal and a second signal;
extracting a first weighting factor and a second weighting factor from the first signal and the second signal while estimating a channel ratio for the first signal and the second signal; and
performing signing combining using the first weighting factor and the second weighting factor;
wherein the channel ratio being estimated comprises a channel gain ratio between dedicated pilot symbols and common pilot symbols.

47. The method of claim 46, further comprising:
converting the first signal and the second signal to baseband signals;
wherein extracting the first weighting factor and the second weighting factor from the first signal and the second signal while estimating the channel ratio for the first signal and the second signal comprises extracting the first weighting factor and the second weighting factor from the baseband signals while estimating a channel ratio for the baseband signals.

48. The method of claim 47, further comprising:
descrambling the baseband signals.

49. The method of claim 46, wherein extracting the first weighting factor and the second weighting factor from the first signal and the second signal while estimating the channel ratio for the first signal and the second signal further comprises using an estimation of the channel ratio.

50. The method of claim 49, wherein using the estimation of the channel ratio further comprises using an estimation of the channel ratio â expressible as:

$$\hat{a}_{w_1,w_2} = \sqrt{\frac{|f(n)|^2}{|\hat{w}_1\hat{g}_1(n) + \hat{w}_2\hat{g}_2(n)|^2}},$$

where f(n) is an estimate of a channel gain, $\hat{w}_1$ is an estimate for the first weighting factor, $\hat{w}_2$ is an estimate for the first weighting factor, $\hat{g}_1(n)$ is an estimate of a first channel gain, $\hat{g}_2(n)$ is an estimate of a second channel gain, for slot n.

51. The method of claim 50, wherein the estimate of the channel gain f(n) is an estimate of a channel gain for dedicated pilot symbols, wherein the estimate of the first channel gain $\hat{g}_1(n)$ is an estimate of a first channel gain for dedicated pilot symbols, and wherein the estimate of the second channel gain $\hat{g}_2(n)$ is an estimate of a second channel gain for dedicated pilot symbols.

52. The method of claim 50, wherein extracting the first weighting factor and the second weighting factor from the first signal and the second signal while estimating the channel ratio for the first signal and the second signal further comprises extracting the first weighting factor and the second weighting factor from the first signal and the second signal while estimating the channel ratio for the first signal and the second signal consistent with a maximum likelihood method.

53. The method of claim 52, wherein extracting the first weighting factor and the second weighting factor from the first signal and the second signal while estimating the channel ratio for the first signal and the second signal consistent with the maximum likelihood method further comprises extracting the first weighting factor and the second weighting factor from the first signal and the second signal while estimating the channel ratio for the first signal and the second signal consistent with the maximum likelihood method using an estimation for weighting factors expressible as:

$$\hat{w} = \underset{w}{\operatorname{argmax}} \left[ \sum_{l=1}^{L} -2\operatorname{Real}\left\{ \frac{y_{d2}(n,l)^H \begin{bmatrix} \frac{d(1)(\hat{w}_1\hat{g}_1(n,l) + \hat{w}_2\hat{g}_2(n,l))}{a_{w_1,w_2}} \\ \frac{d(2)(\hat{w}_1\hat{g}_1(n,l) + \hat{w}_2\hat{g}_2(n,l))}{a_{w_1,w_2}} \\ \ldots \\ \frac{d(K)(\hat{w}_1\hat{g}_1(n,l) + \hat{w}_2\hat{g}_2(n,l))}{a_{w_1,w_2}} \end{bmatrix}}{\sigma_l^2} \right\} + \mu_2(n)^H C^{-1}\mu_2(n) \right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

54. The method of claim 50, wherein extracting the first weighting factor and the second weighting factor from the first signal and the second signal while estimating the channel ratio for the first signal and the second signal further comprises extracting the first weighting factor and the second weighting factor from the first signal and the second signal while estimating the channel ratio for the first signal and the second signal consistent with a maximum a priori (MAP) method.

55. The method of claim 54, wherein extracting the first weighting factor and the second weighting factor from the first signal and the second signal while estimating the channel ratio for the first signal and the second signal consistent with the MAP method further comprises extracting the first weighting factor and the second weighting factor from the first signal and the second signal while estimating the channel ratio for the first signal and the second signal consistent with the MAP method using an estimation for weighting factors expressible as:

$$\hat{w} = \underset{w}{\operatorname{argmax}} \left[ \sum_{l=1}^{L} -2\operatorname{Real}\left\{ \frac{y_{d2}(n,l)^H \begin{bmatrix} d(1)(\hat{w}_1 \hat{g}_1(n,l) + \hat{w}_2 \hat{g}_2(n,l))a_{w_1,w_2} \\ d(2)(\hat{w}_1 \hat{g}_1(n,l) + \hat{w}_2 \hat{g}_2(n,l))a_{w_1,w_2} \\ \cdots \\ d(K)(\hat{w}_1 \hat{g}_1(n,l) + \hat{w}_2 \hat{g}_2(n,l))a_{w_1,w_2} \end{bmatrix}}{\sigma_l^2} \right\} + a_{w_1,w_2} \mu_2(n)^H C^{-1} \mu_2(n) + 10\ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

56. The method of claim 46, wherein extracting the first weighting factor and the second weighting factor from the first signal and the second signal while estimating the channel ratio for the first signal and the second signal further comprises extracting the first weighting factor and the second weighting factor from the first signal and the second signal while estimating the channel ratio for the first signal and the second signal consistent with a maximum likelihood method.

57. The method of claim 56, wherein extracting the first weighting factor and the second weighting factor from the first signal and the second signal while estimating the channel ratio for the first signal and the second signal consistent with the maximum likelihood method further comprises extracting the first weighting factor and the second weighting factor from the first signal and the second signal while estimating the channel ratio for the first signal and the second signal consistent with the maximum likelihood method using an estimation for weighting factors expressible as:

$$\hat{w} = \underset{w}{\operatorname{argmax}} \left[ \sum_{l=1}^{L} -2\operatorname{Real}\left\{ \frac{y_{d2}(n,l)^H \begin{bmatrix} \frac{d(1)(\hat{w}_1 \hat{g}_1(n,l) + \hat{w}_2 \hat{g}_2(n,l))}{a_{w_1,w_2}} \\ \frac{d(2)(\hat{w}_1 \hat{g}_1(n,l) + \hat{w}_2 \hat{g}_2(n,l))}{a_{w_1,w_2}} \\ \cdots \\ \frac{d(K)(\hat{w}_1 \hat{g}_1(n,l) + \hat{w}_2 \hat{g}_2(n,l))}{a_{w_1,w_2}} \end{bmatrix}}{\sigma_l^2} \right\} + \mu_2(n)^H C^{-1} \mu_2(n) \right],$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

58. The method of claim 46, wherein extracting the first weighting factor and the second weighting factor from the first signal and the second signal while estimating the channel ratio for the first signal and the second signal further comprises extracting the first weighting factor and the second weighting factor from the first signal and the second signal while estimating the channel ratio for the first signal and the second signal consistent with a maximum a priori (MAP) method.

59. The method of claim 58, wherein extracting the first weighting factor and the second weighting factor from the first signal and the second signal while estimating the channel ratio for the first signal and the second signal consistent with the MAP method further comprises extracting the first weighting factor and the second weighting factor from the first signal and the second signal while estimating the channel ratio for the first signal and the second signal consistent with the MAP method using an estimation for weighting factors expressible as:

$$\hat{w} = \underset{w}{\operatorname{argmax}} \left[ \sum_{l=1}^{L} -2\operatorname{Real}\left\{ \frac{y_{d2}(n,l)^H \begin{bmatrix} d(1)(\hat{w}_1 \hat{g}_1(n,l) + \hat{w}_2 \hat{g}_2(n,l)) a_{w_1,w_2} \\ d(2)(\hat{w}_1 \hat{g}_1(n,l) + \hat{w}_2 \hat{g}_2(n,l)) a_{w_1,w_2} \\ \cdots \\ d(K)(\hat{w}_1 \hat{g}_1(n,l) + \hat{w}_2 \hat{g}_2(n,l)) a_{w_1,w_2} \end{bmatrix}}{\sigma_l^2} \right\} + a_{w_1,w_2} \mu_2(n)^H C^{-1} \mu_2(n) + 10\ln(p(w)) \right]$$

where $\hat{w}_1$ is an estimate for the first weighting factor, $\hat{w}_2$ is an estimate for the second weighting factor, $\hat{g}_1(n,l)$ is an estimate of a first channel gain for dedicated pilot symbols, $\hat{g}_2(n,l)$ is an estimate of a second channel gain for dedicated pilot symbols, n is a slot, l is a path index, $\sigma_l$ is a variance, $C^{-1}$ is an inverse of a noise variance matrix, d(l) is an lth dedicated pilot signal, K is a number of dedicated pilot symbols, L is a number of paths, H is a complex conjugate operation, ln(x) is natural logarithm of x, p(w) is a prior probability of using a given weighting factor, and $$\mu_2(n) = \left[ \frac{1}{\sqrt{2}} b_1(w_1 h_1(n) + w_2 h_2(n)) \quad \frac{1}{\sqrt{2}} b_2(w_1 h_1(n) + w_2 h_2(n)) \quad \cdots \quad \frac{1}{\sqrt{2}} b_K(w_1 h_1(n) + w_2 h_2(n)) \right]^T,$$

where $b_j$ is a jth dedicated pilot symbol, $h_i(n)$ are stacked channel gains from an ith antenna to the device via different paths at an nth slot, and T is a matrix transpose operation.

* * * * *